(12) United States Patent
Wang et al.

(10) Patent No.: US 11,263,928 B2
(45) Date of Patent: Mar. 1, 2022

(54) MANUFACTURING METHOD OF FLEXIBLE DISPLAY PANEL, FLEXIBLE DISPLAY PANEL AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Ge Wang, Beijing (CN); Zhiliang Jiang, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 16 days.

(21) Appl. No.: 16/435,026

(22) Filed: Jun. 7, 2019

(65) Prior Publication Data
US 2020/0126459 A1 Apr. 23, 2020

(30) Foreign Application Priority Data
Oct. 22, 2018 (CN) .......................... 201811232181.5

(51) Int. Cl.
*G09F 9/30* (2006.01)
*G06F 1/16* (2006.01)
(Continued)

(52) U.S. Cl.
CPC .............. *G09F 9/301* (2013.01); *B32B 37/14* (2013.01); *B32B 38/10* (2013.01);
(Continued)

(58) Field of Classification Search
CPC ... B32B 2038/047; B32B 37/14; B32B 38/10; G02F 1/133305; G06F 1/1637;
(Continued)

(56) References Cited

U.S. PATENT DOCUMENTS

2014/0183473 A1 7/2014 Lee et al.
2014/0217373 A1 8/2014 Youn et al.
(Continued)

FOREIGN PATENT DOCUMENTS

CN 104347678 A 2/2015
CN 105977400 A 9/2016
(Continued)

OTHER PUBLICATIONS

Written Opinion of CN201811232181.*
Notice of First Review Opinion and English language translation, CN Application No. 201811232181.5, dated Jun. 28, 2020, 22 pp.

*Primary Examiner* — Sonya M Sengupta
(74) *Attorney, Agent, or Firm* — Myers Bigel, P.A.

(57) ABSTRACT

A manufacturing method of a flexible display panel includes providing a display substrate which includes a substrate bending region, attaching a back film onto a back surface of the display substrate. A region of the back film corresponding to the substrate bending region is a back film bending region. The manufacturing method includes removing at least the back film bending region to form a perforated region, and bending the display substrate toward the back surface thereof along the substrate bending region to form a flexible display panel.

18 Claims, 7 Drawing Sheets

(51) Int. Cl.
*G09G 3/00* (2006.01)
*B32B 37/14* (2006.01)
*B32B 38/10* (2006.01)
*G02F 1/1333* (2006.01)
*B32B 38/04* (2006.01)
*B31F 1/00* (2006.01)

(52) U.S. Cl.
CPC ...... *G02F 1/133305* (2013.01); *G06F 1/1652* (2013.01); *G09G 3/035* (2020.08); *B31F 1/0006* (2013.01); *B32B 2038/047* (2013.01); *G09G 2310/0264* (2013.01)

(58) Field of Classification Search
CPC ................. G06F 1/1652; G09F 9/301; G09G 2310/0264; G09G 3/035; H01L 2924/01079
USPC .................................................. 156/227, 252
See application file for complete search history.

(56) References Cited

U.S. PATENT DOCUMENTS

| | | |
|---|---|---|
| 2015/0036300 A1 | 2/2015 | Park et al. |
| 2018/0175323 A1 | 6/2018 | Ahn et al. |
| 2018/0180911 A1 | 6/2018 | Odaka |
| 2018/0224688 A1 | 8/2018 | Chen et al. |
| 2019/0326529 A1 | 10/2019 | Xie et al. |

FOREIGN PATENT DOCUMENTS

| | | |
|---|---|---|
| CN | 106653777 A | 5/2017 |
| CN | 107195642 A | 9/2017 |
| CN | 107728348 A | 2/2018 |
| CN | 107976725 A | 5/2018 |
| CN | 108172126 A | 6/2018 |
| CN | 207800055 U | 8/2018 |
| CN | 108538762 A | 9/2018 |
| CN | 108648632 A | 10/2018 |
| KR | 20180070784 A | 6/2018 |
| WO | 2014104711 A1 | 7/2014 |

\* cited by examiner

MANUFACTURING METHOD OF FLEXIBLE DISPLAY PANEL, FLEXIBLE DISPLAY PANEL AND DISPLAY DEVICE

CROSS REFERENCE TO RELATED APPLICATIONS

This application claims the priority of Chinese patent application No. 201811232181.5 filed on Oct. 22, 2018, the entire content of which is hereby incorporated by reference.

TECHNICAL FIELD

The present disclosure relates to a technical field of a liquid crystal display, in particular to a manufacturing method of a flexible display panel, a flexible display panel and a display device.

BACKGROUND

In the process of manufacturing a flexible Organic Light-Emitting Diode (OLED) display, it is usually necessary to bond a polarizer (POL), a flexible panel, a back film, etc. together. At present, the manufacturing process of a flexible display device (taking a flexible OLED display as an example) generally comprises the following steps: manufacturing an OLED device on a flexible substrate, then carrying out a thin film packaging process on the OLED device, and attaching a front protective film and a back protective film (hereinafter referred to as a back film). It should be noted that the positional terms "front" and "back" here are relative concepts, not absolute concepts. For convenience of description, in this application, the direction toward the display surface side is referred to as a front direction, and the direction facing away from the display surface side is referred to as a backward direction.

The flexible panel can be divided into a display region for displaying images and a non-display region for attaching other functional modules such as a drive circuit and the like. In order to realize a narrow border, the non-display region of the flexible panel can be bent (folded) toward the back side of the display panel (i.e., the side opposite to the display surface). After that, other functional modules are assembled, such as bonding a drive circuit module. When bending the non-display region of the flexible panel towards the back side of the display panel, due to the existence of the back film, the stress during bending will be larger and the bending radius will be larger, which will seriously affect the production efficiency.

SUMMARY

In view of this, the first aspect of the present disclosure provides a manufacturing method of a flexible display panel which comprises the following steps: providing a display substrate, wherein the display substrate comprises a substrate bending region; attaching a back film onto the back surface of the display substrate, wherein the region of the back film corresponding to the substrate bending region is a back film bending region; removing at least the back film bending region to form a perforated region; and bending the display substrate toward the back surface thereof along the substrate bending region to form the flexible display panel.

According to some exemplary embodiments of the present disclosure, the display substrate comprises a first display region and a first non-display region, and the first non-display region comprises the substrate bending region adjacent to the first display region; a first bonding region adjacent to the substrate bending region and away from the first display region; and first corner cutting region(s) located at one or both sides of the first non-display region and adjacent to the first display region. Corresponding to respective functional regions of the display substrate, the back film comprises a second display region corresponding to the first display region of the display substrate and a second non-display region corresponding to the first non-display region of the display substrate, wherein the second non-display region comprises the back film bending region adjacent to the second display region; a second bonding region adjacent to the back film bending region and away from the second display region; and second corner cutting region(s) located at one or both sides of the second non-display region and adjacent to the second display region.

According to some exemplary embodiments of the present disclosure, the manufacturing method further comprises: cutting off the first corner cutting region(s) of the display substrate before bending the display substrate, and at the same time cutting off the second corner cutting region(s) of the back film.

According to some exemplary embodiments of the present disclosure, the manufacturing method further comprises assembling additional functional modules of the flexible display panel after bending the display substrate. Assembling the additional functional modules of the flexible display panel comprises: bonding a drive circuit module at a front surface of the first bonding region of the display substrate.

According to some exemplary embodiments of the present disclosure, removing at least the back film bending region to form the perforated region comprises one of the following steps: removing only the back film bending region; removing both the bending region and the second corner cutting region of the back film; removing all of the bending region, the second corner cutting region and the second bonding region of the back film.

According to some exemplary embodiments of the present disclosure, removing at least the back film bending region is performed by at least one of laser lifting off, etching with etching solution, and mechanical cutting.

According to some exemplary embodiments of the present disclosure, each second corner cutting region of the back film comprises: a first region corresponding to the back film bending region in a first direction of the back film; and a second region corresponding to the second bonding region of the back film in the first direction, wherein removing both the bending region and the second corner cutting region(s) of the back film comprises one of the following steps:
removing the bending region and the first region of the second corner cutting region of the back film while leaving the second region of the second corner cutting region; and removing all of the back film bending region, the first region of the second corner cutting region, and the second region of the second corner cutting region.

The second aspect of the present disclosure provides another manufacturing method of a flexible display panel, including the following steps: providing a display substrate including a substrate bending region; providing a structured back film, wherein the structured back film has a perforated region, and the perforated region at least comprises a back film bending region corresponding to the substrate bending region; attaching the structured back film to the back surface of the display substrate; and, bending the display substrate toward the back surface along the substrate bending region to form the flexible display panel.

According to some exemplary embodiments of the present disclosure, providing the structured back film comprises one of the following steps: removing only the back film bending region; removing both the bending region and the second corner cutting region(s) of the back film; removing all of the bending region, the second corner cutting region(s) and the second bonding region of the back film.

According to some exemplary embodiments of the present disclosure, providing the structured back film is performed by at least one of pattern etching, pattern printing, laser printing, and precision machining.

A third aspect of the present disclosure provides a flexible display panel manufactured by any one of the manufacturing methods described above. Wherein the flexible display panel comprises a display substrate and a back film positioned on the back surface of the display substrate. The display substrate comprises a first display region and a first non-display region. The first non-display region comprises the substrate bending region adjacent to the first display region; a first bonding region adjacent to the substrate bending region and away from the first display region; and first corner cutting region(s) located at one or both sides of the first non-display region and adjacent to the first display region. Corresponding to respective functional regions of the display substrate, the back film comprises a second display region and a second non-display region, wherein the second non-display region comprises the back film bending region adjacent to the second display region; a second bonding region adjacent to the back film bending region and away from the second display region; and second corner cutting region(s) located at one or both sides of the second non-display region and adjacent to the second display region, wherein the display substrate is bent toward the back of the substrate along the substrate bending region.

According to some exemplary embodiments of the present disclosure, the back film has a perforated region at least in the back film bending region, and a drive circuit module is bonded to the front surface of the display substrate.

According to some exemplary embodiments of the present disclosure, the back film includes a protective film and a pressure sensitive adhesive layer in its thickness direction, the protective film is a polyimide film or a polyethylene terephthalate film, the thickness of the pressure sensitive adhesive layer is within a range of [10 .mu.m, 25 .mu.m], and the thickness of the protective film is within a range of [50 .mu.m, 150 .mu.m].

A fourth aspect of the present disclosure also provides a display device including any of the flexible display panels described above.

DETAILED DESCRIPTION

In order to make the object, technical solution and advantages of the present disclosure clearer, the following will clearly and completely describe the technical solution in the embodiment of the present disclosure with reference to the drawings in the embodiment of the present disclosure.

Some exemplary embodiments of the present disclosure provide a manufacturing method of a flexible display panel, a flexible display panel and a display device, which are configured to reduce stress in a bending region of the flexible display panel during bending, reduce difficulty in bending the bending region of the flexible display panel, and improve product quality.

The specific embodiments of the manufacturing method of the flexible display panel, the flexible display panel and the display device provided by some exemplary embodiments of the present disclosure will be described in detail below with reference to the accompanying drawings.

The thickness and shape of each film layer in the drawings do not reflect the true proportion, and the purpose is to schematically illustrate the present disclosure. The back film includes an adhesive layer (such as a pressure sensitive adhesive layer, PSA) and a PET layer in the thickness direction.

Figure 1:
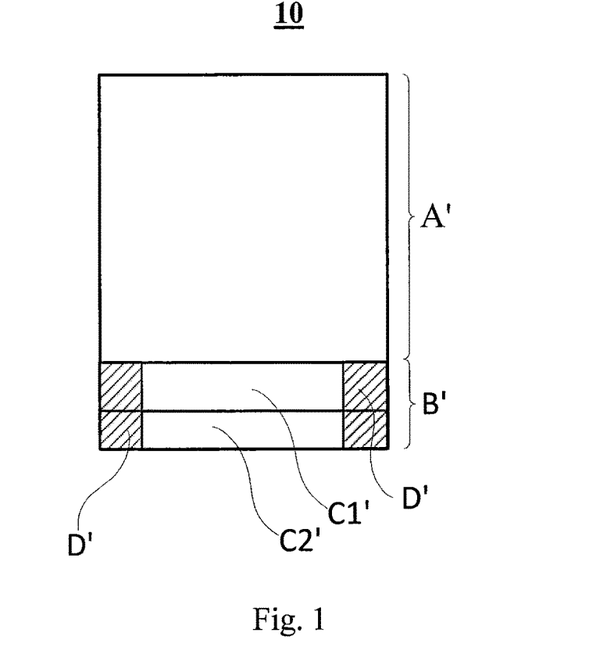
FIG. 1 is a schematic view of functional region division of a display substrate of a flexible panel provided by some exemplary embodiments of the present disclosure.
Figure 11:
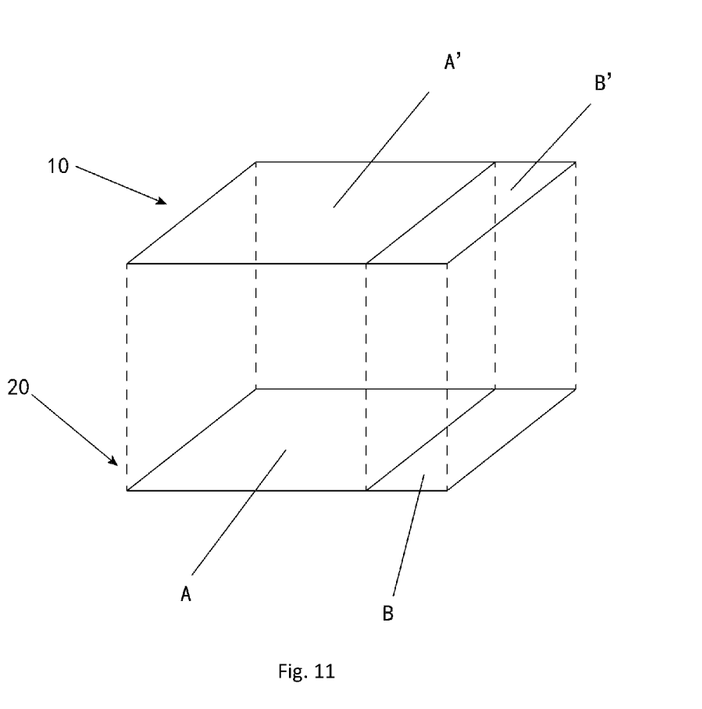
FIG. 11 is a schematic exploded view showing an alignment of corresponding regions between the display substrate and the back film.

The flexible display panel includes a display substrate 10 and a back film 20 positioned on the back surface of the display substrate 10. In order to facilitate the description of the back film 20, the division of functional regions of the display substrate 10 of the flexible panel provided by some exemplary embodiments of the present disclosure will be described first. As shown in FIG. 1 and FIG. 11, the display substrate 10 of the flexible panel provided by some exemplary embodiments of the present disclosure includes a first display region A' and a first non-display region B', wherein the first non-display region B' includes a bending region C1' adjacent to the first display region A'; a first bonding region C2' adjacent to the bending region C1' and away from the first display region A'; and region(s) to be cut D' located at one or both sides of the first non-display region B' and adjacent to the first display region A'. FIG. 1 exemplarily shows two regions D' to be cut at both sides of the first non-display region B', as shown by hatching in FIG. 1. In order not to interfere with other functional elements (e.g., a drive circuit module to be bonded in the first bonding region C2', etc.), and in order to facilitate bending of the first non-display region B' along the bending region C1', the region to be cut D' can be cut and removed before bending, and the region of the display substrate 10 of the flexible panel corresponding to this portion to be cut and removed is referred to as first corner cutting region D'.

Figure 2:
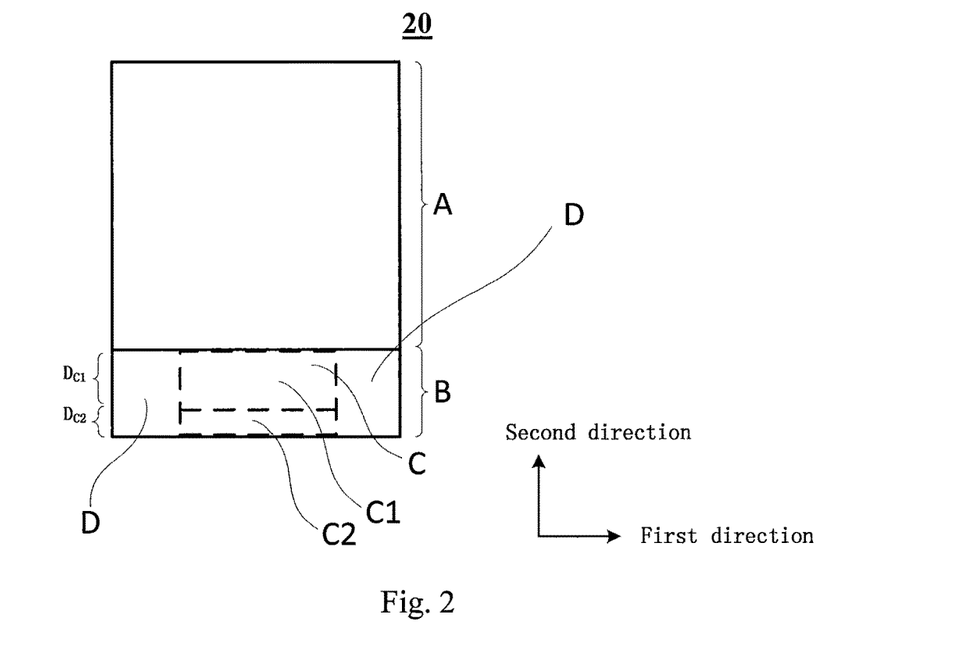
FIG. 2 is a schematic structural view of a back film provided by some exemplary embodiments of the present disclosure.

Corresponding to respective functional regions of the display substrate 10 of the flexible panel shown in FIG. 1, as shown in FIG. 2 and FIG. 11, the back film includes a second display region A and a second non-display region B, wherein the second non-display region B includes a bending region C1 adjacent to the second display region A; a second bonding region C2 adjacent to the bending region C1 and away from the second display region A; and second corner cutting region(s) D located at one side (see FIGS. 3-4) or both sides (see FIGS. 2, 5-6) of the second non-display region B and adjacent to the second display region A. Whether the second corner cutting region(s) D of the back film is located at one side or both sides of the second non-display region B depends on that the first corner cutting region(s) D' of the display substrate 10 is located at one side or both sides of the display substrate 10. As an example, corresponding to FIG. 1, two second corner cutting regions D of the back film located at both sides of the second non-display region B are exemplarily shown in FIG. 2. Each second corner cutting region D of the back film can be subdivided into: a first region $D_{C1}$ in the second corner cutting region D corresponding to the bending region C1 in the first direction of the back film; and a second region $D_{C2}$ in the second corner cutting region D corresponding to the second bonding region C2 in the first direction. Here, the second direction of the back film refers to the direction from the second non-display region B to the second display region A. The first direction refers to a direction perpendicular to the second direction.

Here, a certain region X of the back film 20 corresponds to a certain region X' of the display substrate 10, which means that an orthographic projection of the region X of the back film 20 on the display substrate 10 in the thickness direction of the display substrate 10 is substantially identical to or coincides with the region X' of the display substrate 10, in other words, the orthographic projection of the region X of the back film 20 on the display substrate 10 along the thickness direction of the display substrate 10 substantially covers the region X' of the display substrate 10.

As to the specific removal step of the second corner cutting region D of the back film, the specific description is as follows: on the one hand, when the first corner cutting region D' of the display substrate 10 is removed, the second corner cutting region D of the back film can be removed together; on the other hand, it is also possible to remove the second corner cutting region D of the back film before removing the first corner cutting region D' of the display substrate 10, and then attach the back film from which the second corner cutting region D has been removed to the flexible substrate. The region of the back film corresponding to this removed or to be removed portion is hereinafter referred to as the second corner cutting region D of the back film.

With continued reference to FIG. 2, in order to facilitate bending the non-display region B' of the display substrate 10 toward the back side of the flexible panel, the bending region C1 of the back film may be removed to form a perforated region C. Then, the non-display region B of the flexible panel is bent along the perforated region C, that is, the display substrate 10 and the back film are bent together with the perforated region C as the bending region C1. After that, other functional modules are assembled, for example, a drive circuit module is bonded in the bonding region C2 to form the flexible display device.

In the above manufacturing process, the method of removing the bending region C1 of the back film to form the perforated region C is specifically described as follows.

On the one hand, a method of attaching first and then removing can be adopted, i.e. attaching the entire surface of the back film to the back surface of the display substrate 10; removing at least part of at least the bending region C1 of the back film by, for example, laser lifting off. It should be noted that the step of removing at least part of the bending region C1 of the back film includes one of the following steps: removing only the bending region C1 of the back film; removing both the bending region C1 and the second corner cutting region D of the back film; and removing the bending region C1, the second corner cutting region D and the second bonding region C2 of the back film. Referring to FIG. 2, for convenience of description, two directions of the back film are defined here: a first direction and a second direction. Here, the second direction of the back film refers to the direction from the second non-display region B to the second display region A; the first direction refers to a direction perpendicular to the second direction. Further, the step of removing both the bending region C1 and the second corner cutting region D of the back film further includes removing the bending region C1 of the back film and the first region $D_{C1}$ in the second corner cutting region D corresponding to the bending region C1 in the first direction, while leaving the second region $D_{C2}$ in the second corner cutting region D corresponding to the second bonding region C2 in the first direction; or removing all of the bending region C1 of the back film, the first region $D_{C1}$ in the second corner cutting region D corresponding to the bending region C1 in the first direction, and the second region $D_{C2}$ in the second corner cutting region D corresponding to the second bonding region C2 in the first direction.

However, in practice, when laser is used to lift off and remove the back film along the thickness direction of the back film, in order to avoid damaging the circuit in the OLED flexible display panel, the lifting off operation should be stopped when reaching the adhesive layer of the back film in thickness, i.e. only the PET layer of the back film is lifted off and removed, while the adhesive layer is retained, and further lifting off will cause circuit damage in the panel. The disadvantage of this method of attaching first and then removing is that since the adhesive layer is retained, the thickness of the back film located in the bending region is still relatively large, which is not conducive to bending operation. At the same time, the thermal effect of laser and the particle produced in the lifting off process are easy to cause circuit damage.

On the other hand, it is also possible to adopt a method of structuring first and then attaching, that is, before attaching the back film to the display substrate 10, the back film is structured by patterning process, laser printing or precision machining process, etc., wherein at least the bending region C1 of the manufactured back film is removed, thereby forming a perforated region C. Compared with the method of attaching first and then removing, the method of structuring first and then attaching does not have the problem of adhesive layer residue in the bending region C, that is, there is no back film at least in the bending region C1, and the thickness of the bending region C1 is smaller, which is conducive to bending operation, thus improving bending efficiency.

Referring to FIG. 2, the method of structuring first and then attaching will be described in further detail. Removing at least the bending region C1 includes one of the following removing ways:

removing only the bending region C1 of the back film; removing both the bending region C1 and the second corner cutting region(s) D of the back film; removing all of the bending region C1, the second corner cutting region D and the second bonding region C2 of the back film, wherein removing both the bending region C1 and the second corner cutting region D of the back film further comprises removing the bending region C1 of the back film and the first region $D_{C1}$ in the second corner cutting region D corresponding to the bending region C1 in the first direction, while leaving the second region $D_{C2}$ in the second corner cutting region D corresponding to the second bonding region C2 in the first direction; or removing the bending region C1 of the back film, the first region $D_{C1}$ in the second corner cutting region D corresponding to the bending region C1 in the first direction, and the second region $D_{C2}$ in the second corner cutting region D corresponding to the second bonding region C2 in the first direction. It should be noted that when the back film is structured by methods such as patterning process, laser printing or precision machining process, if the bending region C1 and the entire second corner cutting region(s) D (including the first region $D_{C1}$ and the second region $D_{C2}$) of the back film or only the bending region C1 and the first region $D_{C1}$ of the second corner cutting region D of the back film are removed, the resulting back film is divided into two pieces along the second direction, an upper piece and a lower piece: one piece is a back film corresponding to the second display region A; the other piece is a back film corresponding to the second bonding region C2 or a back film corresponding to the second bonding region C2 and the region $D_{C2}$. The processing method for forming the two pieces of back films has the advantages that although no back film exists in the bending region and the required bending force is at the minimum, the processing precision and the attaching precision of the back film material are required to be very high, the perforated region is easy to offset, subsequent bending is influenced, and the processing cost is high. In addition, after the drive circuit is bonded to the panel, the heat dissipated in the drive circuit will be transferred to the back film. Since the area of the back film corresponding to the second bonding region C2 is small, it is easy to soften quickly after being heated, resulting in defects such as wrinkles.

Figure 9:
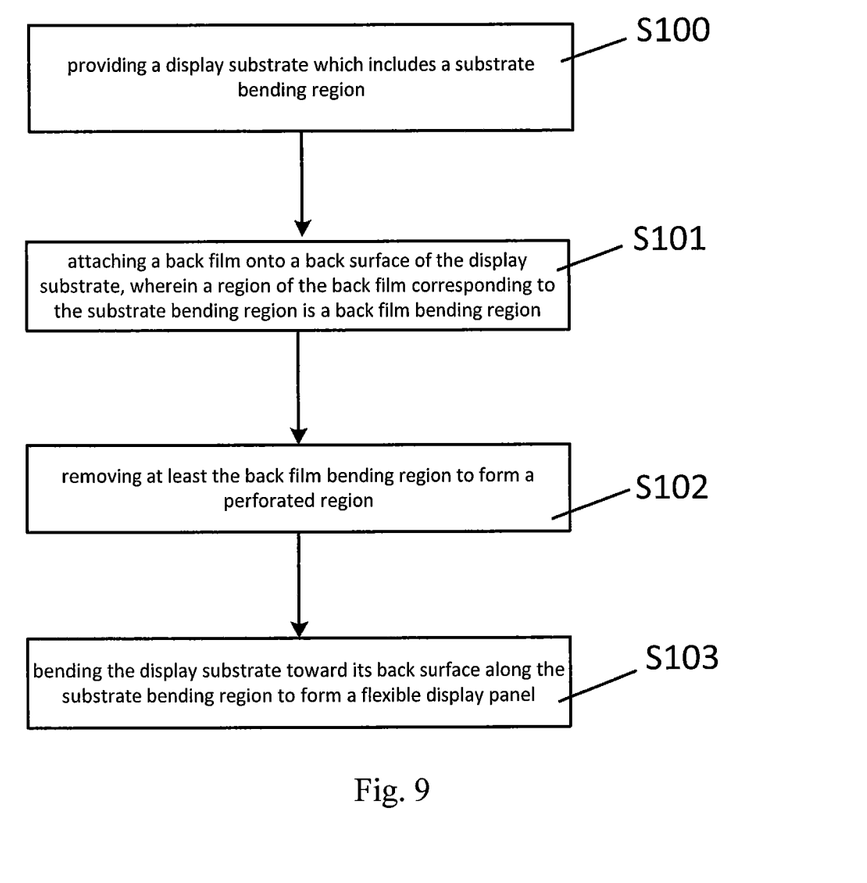
FIG. 9 is a flowchart of a manufacturing method of a flexible display panel provided by some exemplary embodiments of the present disclosure.

Referring to FIG. 9, some exemplary embodiments of the present disclosure provide a manufacturing method of a flexible display panel, which specifically includes the following steps:

Step S100: providing a display substrate 10 which includes a bending region C1' of the substrate;

Step S101: attaching a back film 20 onto the back surface of the display substrate 10, wherein the region of the back film 20 corresponding to the bending region C1' of display substrate is the bending region C1 of the back film;

In step S102, removing at least the bending region C1 of the back film to form a perforated region C, wherein the bending region C1 of the back film 20 corresponds to the bending region C1' of the display substrate 10. The step of removing the bending region C1 of the back film 20 includes removing the bending region C1 of the back film 20 by laser lifting off, etching with etching solution, or mechanical cutting.

In step S103, bending the display substrate 10 toward the back surface along the bending region C1' of the display substrate to form the flexible display panel.

Figure 10:
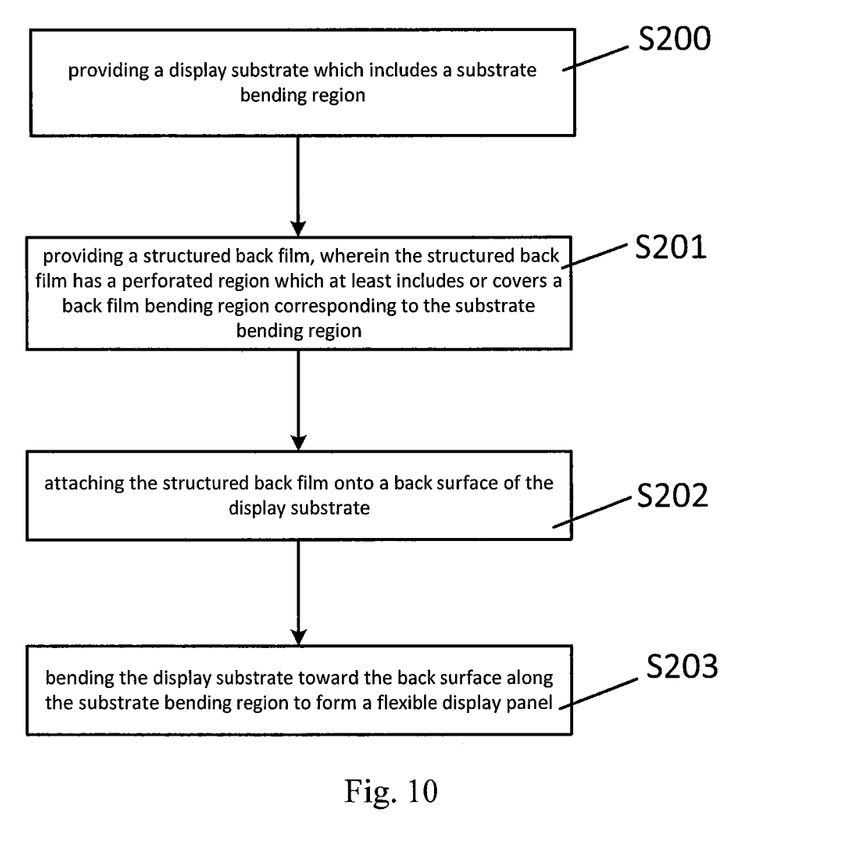
FIG. 10 is a flowchart of another manufacturing method of the flexible display panel.

Referring to FIG. 10, some exemplary embodiments of the present disclosure also provide another manufacturing method of the flexible display panel, which specifically includes the following steps:

Step S200: providing a display substrate 10 which includes a bending region C1' of the substrate;

Step S201: providing a structured back film, wherein the structured back film has a perforated region C, and the perforated region C at least include or cover the bending region C1 of the back film corresponding to the bending region C1' of the substrate.

Step S202: attaching the structured back film onto the back surface of the display substrate 10; Step S203: bending the display substrate 10 toward the back surface along the bending region C1' of the display substrate to form the flexible display panel.

Step S201: providing a structured back film by a one-step manufacturing method such as pattern etching, pattern printing, laser printing or precision machining, or by manufacturing it in multiple steps by the following method:

first, bonding a pressure sensitive adhesive (PSA) to the flexible substrate 10 to form a pressure sensitive adhesive layer, and then forming a protective film on the side of the pressure sensitive adhesive layer facing away from the flexible substrate. The material of the protective film may include a Polyimide (PI) film or a film formed of polymer material such as Polyethylene terephthalate (PET). In a possible embodiment, the thickness of the pressure-sensitive adhesive layer is smaller than the thickness of the protective film, for example, the thickness of the pressure-sensitive adhesive layer may be within the range of [10 .mu.m, 25 .mu.m], and the thickness of the protective film may be within the range of [50 .mu.m, 150 .mu.m] to ensure that the back film is not easily deformed due to the softening of the pressure-sensitive adhesive layer by heat as much as possible;

after forming the pressure sensitive adhesive layer and the protective film laminated with each other, removing the flexible substrate to form an entire piece of back film;

continuously structuring the entire piece of back film to obtain the structured back film that can be attached to the back surface of the display substrate, i.e., removing at least the bending region C1 of the back film to form a perforated region C. The back film is structured to ensure as little back film 20 as possible in the bending region C1, thereby reducing the stress on the bending region C1 of the flexible display panel during bending and reducing the difficulty of bending the bending region C1 of the flexible display panel. For ease of understanding, the structuring the back film 20 will be described below with reference to FIGS. 1-8.

As shown in FIG. 2, the second non-display region B of the back film 20 includes two second corner cutting regions D. A second bonding region C2 and a bending region C1 are located between the two second corner cutting regions D, respectively. The second bonding region C2 and the bending region C1 are sequentially arranged in a second direction toward the second display region A. The perforated region C shown in FIG. 2 corresponds to the bending region C1, i.e., completely coincides with the bending region C1. The structured back film thus formed has a "hollow-rectangle" shape, i.e. there is only one perforated region C in the middle. Before cutting and removing the second corner cutting regions D, all parts of the structured back film in the "hollow-rectangle" shape are connected with each other, so the attaching precision requirement is not high, the perforated region is not easy to offset, and the method is a compromise solution between reducing bending force and reducing the requirement of attaching precision, and the processing cost is low. Of course, as a variation, the perforated region C can also correspond to the bending region C1 and the second bonding region C2, i.e., completely coincide with the entirety of the bending region C1 and the second bonding region C2. The advantage of this structure is that after the heat dissipated by the drive circuit bonded on the display substrate is transferred to the back film, the back film corresponding to the second bonding region C2 has been perforated, and there is no phenomenon that the adhesive layer softens quickly after being heated, resulting in wrinkles, broken wires and other undesirable phenomena.

Figure 3:
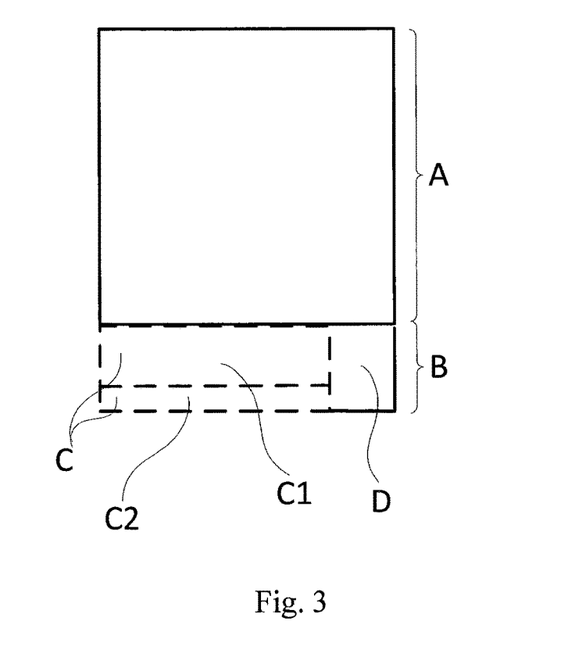
FIG. 3 is a schematic structural view of a back film provided by some exemplary embodiments of the present disclosure.
Figure 4:
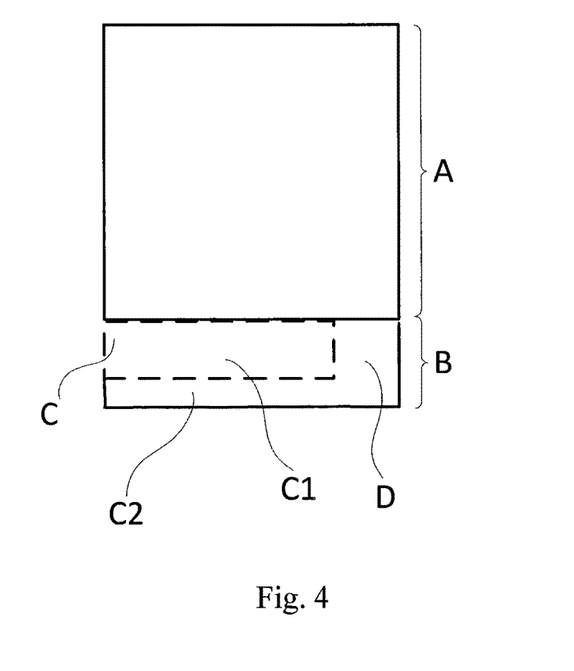
FIG. 4 is a schematic structural view of a back film provided by some exemplary embodiments of the present disclosure.
Figure 5:
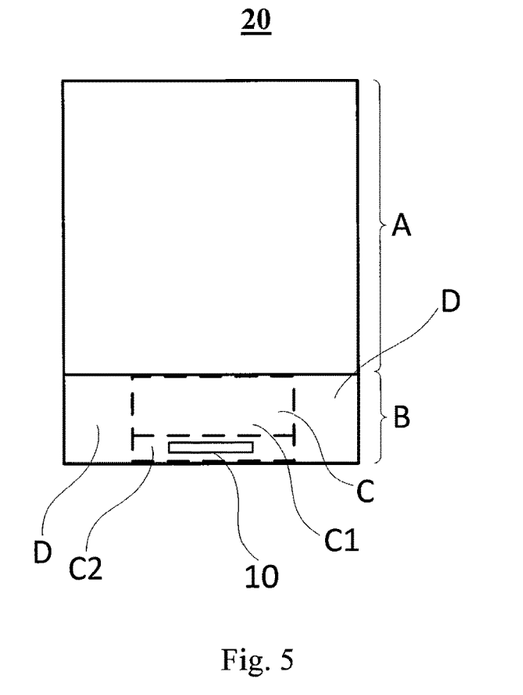
FIG. 5 is a schematic structural view of a back film provided by some exemplary embodiments of the present disclosure.

The structural back film 20 shown in FIG. 3 is different from FIG. 2 in that the second non-display region B of the back film 20 includes only one second corner cutting region D. Correspondingly, the display substrate 10 in FIG. 1 also has only one first corner cutting region D', which is located at one side of the second non-display region B. The perforated region C shown in FIG. 3 includes an area where the bending region C1 and the second bonding region C2 are located. Of course, as a variation, the perforated region C may include only the area where the bending region C1 is located, as shown in FIG. 4. In other words, the perforated region C in FIG. 4 is an area surrounded by the second display region A, the second bonding region C2, and the second corner cutting region D Step S202: attaching the structured back film onto the back surface of the display substrate 10.

Figure 6:
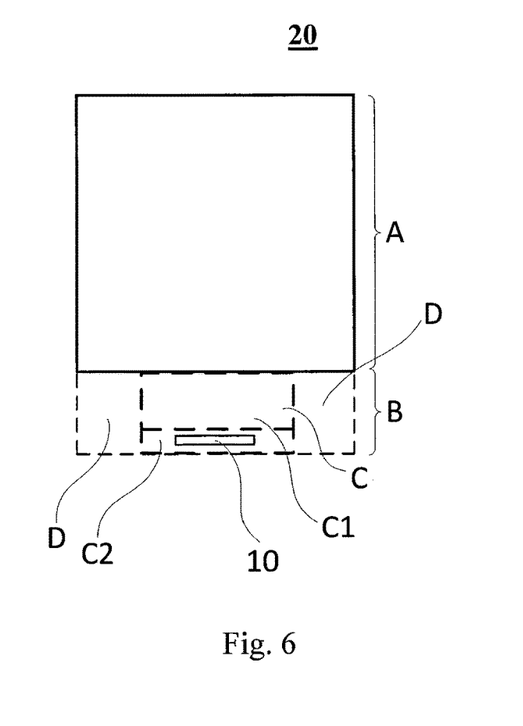
FIG. 6 is a schematic structural view of a back film provided by some exemplary embodiments of the present disclosure.

Between steps S202 and S203, a step of cutting and removing the corner cutting region D of the display substrate 10 is further included, and the back film 20 in the corner cutting region D is removed at the same time. The corner cutting region D shown by solid lines in FIG. 5 has not been cut away. In FIG. 6, the corner cutting region D shown by dashed lines has been cut off.

Similarly, in the method shown in FIG. 9, there are similar cutting steps as described above between step S102 and step S103, which will not be repeated here.

Figure 8:
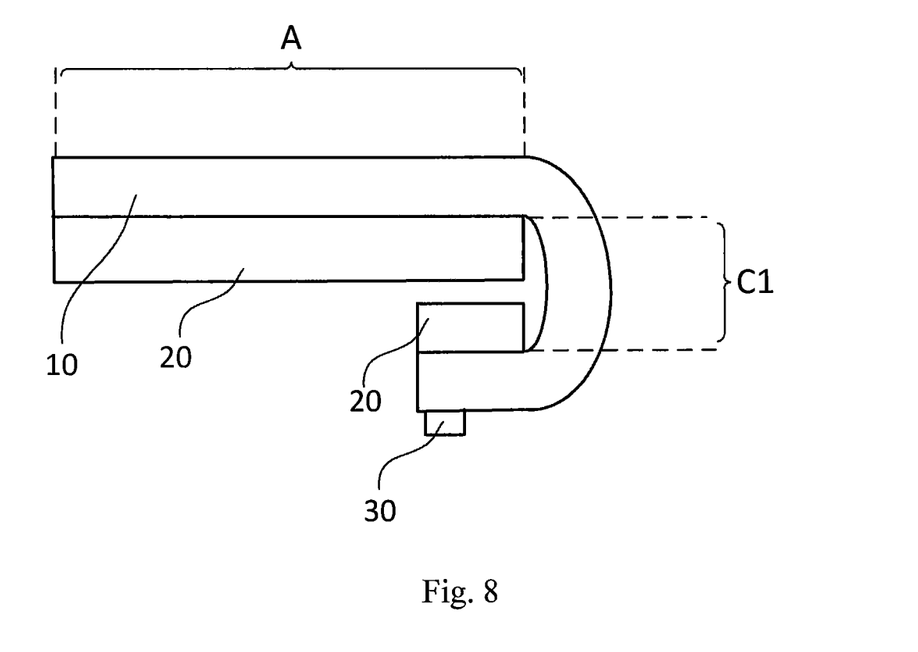
FIG. 8 is a schematic structural view of a flexible display panel provided by some exemplary embodiments of the present disclosure.

As shown in step S203 and FIG. 8, after cutting, the display substrate is bent toward the back surface along the substrate bending region to form the flexible display panel.

In addition, as shown in FIG. 8, after attaching the structured back film 20 to the back surface of the display substrate 10, circuits 30 such as a chip or the like may be bonded at the first bonding region CT on a front surface of the display substrate 10. For example, a Chip On Film (COF), a Flexible Printed Circuit (FPC), and the like are bonded at the first bonding region CT of the display substrate 10. The specific bonding method of COF and FPC is similar to that of the prior art and will not be described here.

In this manufacturing method, the back film 20 is first structured to have a perforated region C, then the back film 20 with the perforated region C is attached to the display substrate 10, then the second corner cutting region D is cut, and finally the display substrate is bent toward the back surface to form the flexible display panel. As the structured back film 20 is attached with the second corner cutting region D before cutting, the back film 20 adjacent to the edge of the perforated region C is not prone to warping. During attaching, the perforated region C of the back film 20 does not need to be perfectly aligned with the bending region C1' of the display substrate 10, so that the requirement on attaching precision is not high, offset is not easy to occur, and the attaching efficiency is improved.

Figure 7:
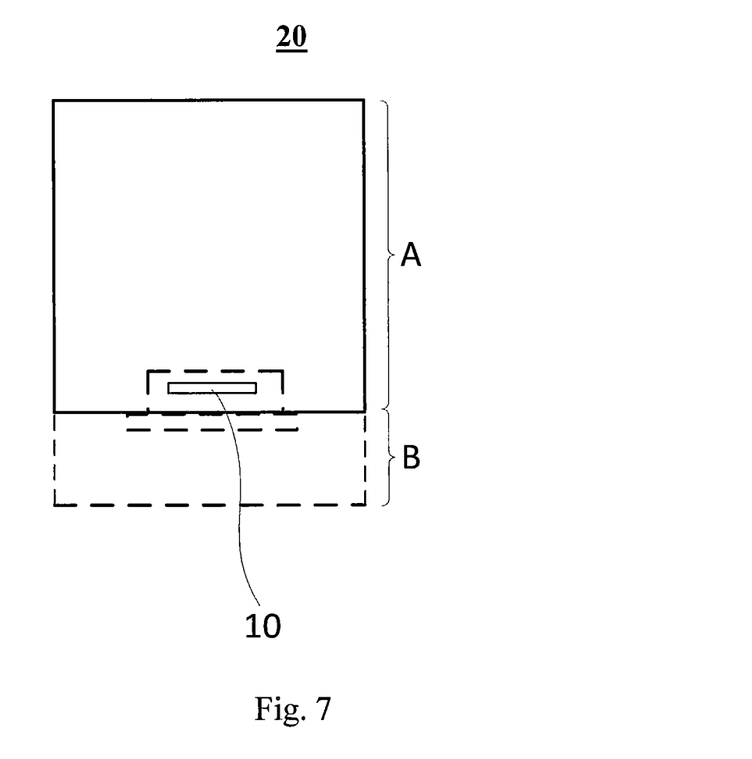
FIG. 7 is a schematic structural view of a back film provided by some exemplary embodiments of the present disclosure.

Since the display substrate 10 is bent toward the back surface along the bending region C1, the second non-display region B is not actually visible when the panel is used, so this is schematically illustrated by a dashed line in FIG. 7.

In some exemplary embodiments of the present disclosure, since the orthographic projection of the perforated region C of the back film 20 in the display substrate 10 covers at least the bending region C1' of the display substrate 10, there is no back film material in the bending region C1' of the display substrate 10. Compared with the prior art, the difficulty in bending the bending region C1' of the flexible display panel is reduced, the stress on the bending region C1' of the flexible display panel during bending is reduced, and the product quality is improved.

Based on the same inventive concept, some exemplary embodiments of the present disclosure also provide a flexible display panel formed by the above-mentioned manufacturing method. Since the principle of the flexible display panel for solving problems is similar to that of the above-mentioned manufacturing method, the implementation of the flexible display panel can be seen in the embodiments of the manufacturing method, and this will not be repeated herein.

In addition, it should be pointed out that although FIG. 8 shows that the circuit chip 30 is bonded to a front surface of the first bonding region of the first non-display region B' of the display substrate 10, the circuit chip 30 may also be bonded to the back surface of the display substrate 10, for example, to the second bonding region C2 of the back film.

It should be noted that the flexible display panel in some exemplary embodiments of the present disclosure can reduce the stress on the bending region of the flexible display panel during bending, reduce the difficulty of bending the bending region of the flexible display panel, and improve the product quality because there is no back film in the bending region.

Based on the same inventive concept, some exemplary embodiments of the present disclosure also provides a display device, including the flexible display panel provided by the embodiments of the present disclosure. The display device can be any product or component with display function such as a mobile phone, a tablet computer, a television, a display, a notebook computer, a digital photo frame, a navigator and the like. The implementation of the display device can be seen in the above-mentioned embodiments of the flexible display panel, and this will not be repeated herein.

It should be understood that although various features and beneficial effects of the present disclosure and specific details of the structure and function of the present disclosure have been set forth in the above description, these contents are merely exemplary, and the specific details thereof, especially the shape, size, number and arrangement of components, may be specifically changed within the scope of the principles of the present disclosure to the overall scope represented by the broad general meaning as claimed in the claims of the present disclosure.

Unless otherwise defined, all technical and scientific terms used in this specification have the same meaning as commonly understood by those skilled in the art to which this disclosure belongs.

Those skilled in the art will understand the term "substantially" herein (such as in "substantially all light" or in "substantially composed of") may also include embodiments having "wholly," "completely," "all," etc. Therefore, in the embodiment, the adjective is also substantially removable. Where applicable, the term "substantially" may also refer to 90% or more, such as 95% or more, specifically 99% or more, even more specifically 99.5% or more, including 100%. The term "comprise" also includes embodiments in which the term "comprise" means "consist of". The term "and/or" specifically refers to one or more of the items mentioned before and after "and/or". For example, the phrase "item 1 and/or item 2" and similar phrases may relate to one or more of items 1 and 2. The term "comprise" may refer to "consist of" in one embodiment, but may also refer to "include at least a defined category and optionally one or more other categories" in another embodiment.

Furthermore, the terms first, second, third, etc. in this specification and in the claims are used to distinguish between similar elements and do not denote any order, quantity, or importance. It should be understood that the terms so used are interchangeable under appropriate circumstances and that the embodiments of the present disclosure described herein are capable of operation in a different order than described or illustrated herein.

"Up", "down", "left" and "right" are only used to indicate the relative positional relationship. When the absolute position of the described object changes, the relative positional relationship may also change accordingly.

It should be noted that the above-mentioned embodiments illustrate rather than limit the present disclosure, and that those skilled in the art will be able to design many alternative embodiments without departing from the scope of the appended claims. In the claims, any reference signs placed between parentheses shall not be construed as limiting the claims. The use of the verb "to include" and its conjugations does not exclude the presence of elements or steps other than those stated in a claim. The words "a" or "an" in the claims of the present disclosure do not exclude plural numbers, and are only intended for convenience of description and should not be construed as limiting the scope of protection of the present disclosure.

The present disclosure may be implemented by means of hardware comprising several distinct elements, and by means of a suitably programmed computer. In the device claim enumerating several devices, several of these devices can be embodied by the same item of hardware. The mere fact that certain measures are recited in mutually different dependent claims does not indicate that a combination of these measures cannot be used to advantage.

The present disclosure is further applicable to devices that include one or more of the characterizing features described in this specification and/or shown in the drawings. The present disclosure further relates to methods or processes that include one or more of the characterizing features described in this specification and/or shown in the drawings.

The various aspects discussed in this patent may be combined to provide additional advantages. In addition, those skilled in the art will understand that embodiments can be combined, and more than two embodiments can also be combined. In addition, some features may form the basis of one or more divisional applications.

The invention claimed is:

1. A manufacturing method of a flexible display panel, comprising:
providing a display substrate which comprises a substrate bending region;
attaching a back film onto a back surface of the display substrate, wherein a region of the back film corresponding to the substrate bending region comprises a back film bending region;
removing at least the back film bending region to form a perforated region; and
bending the display substrate towards the back surface of the display substrate along the substrate bending region to form the flexible display panel,
wherein the display substrate comprises a first display region and a first non-display region,
wherein the first non-display region comprises the substrate bending region adjacent to the first display region, a first bonding region adjacent to the substrate bending region and away from the first display region, and one or more first corner cutting regions at one or both sides of the first non-display region and adjacent to the first display region,
wherein corresponding to respective functional regions of the display substrate, the back film comprises a second display region and a second non-display region, and
wherein the second non-display region comprises the back film bending region adjacent to the second display region, a second bonding region adjacent to the back film bending region and away from the second display region, and one or more second corner cutting regions at one or both sides of the second non-display region and adjacent to the second display region.

2. The manufacturing method according to claim 1, further comprising:
cutting off the one or more first corner cutting regions of the display substrate before bending the display substrate, and
cutting off the one or more second corner cutting regions of the back film at a substantially same time as the cutting off the one or more first corner cutting regions.

3. The manufacturing method according to claim 1, further comprising:
assembling additional functional modules of the flexible display panel after bending the display substrate.

4. The manufacturing method according to claim 3, wherein the assembling the additional functional modules of the flexible display panel comprises:
bonding a drive circuit module on a front surface of the first bonding region of the display substrate.

5. The manufacturing method according to claim 1, wherein the removing at least the back film bending region to form a perforated region comprises:
removing only the back film bending region, removing both the back film bending region and the one or more second corner cutting regions of the back film, or removing the back film bending region, the one or more second corner cutting regions and the second bonding region of the back film.

6. The manufacturing method according to claim 5, wherein removing at least the back film bending region is performed by at least one of laser lifting off, etching with etching solution or mechanical cutting.

7. The manufacturing method according to claim 5, wherein each corner cutting region of the one or more second corner cutting regions of the back film comprises a first region corresponding to the back film bending region in a first direction of the back film, and a second region corresponding to the second bonding region of the back film in the first direction, wherein removing both the back film bending region and the one or more second corner cutting regions of the back film comprises:
removing the back film bending region and the first region of each of the corner cutting regions of the back film while leaving the second region of each of the corner cutting regions; or
removing the back film bending region and the first region and the second region of the corner cutting regions.

8. A manufacturing method of a flexible display panel, comprising:
providing a display substrate comprising a substrate bending region;
providing a structured back film comprising a perforated region, wherein the perforated region comprises a back film bending region corresponding to the substrate bending region;
attaching the structured back film to a back surface of the display substrate; and
bending the display substrate toward the back surface of the display substrate along the substrate bending region to form the flexible display panel,
wherein the display substrate comprises a first display region and a first non-display region,
wherein the first non-display region comprises a first bending region adjacent to the first display region, a first bonding region adjacent to the first bending region and away from the first display region, and one or more first corner cutting regions at one or both sides of the first non-display region and adjacent to the first display region,
wherein corresponding to respective functional regions of the display substrate, the structured back film comprises a second display region and a second non-display region, and
wherein the second non-display region comprises a second bending region adjacent to the second display region, a second bonding region adjacent to the second bending region and away from the second display region, and one or more second corner cutting regions at one or both sides of the second non-display region and adjacent to the second display region.

9. The manufacturing method according to claim 8, further comprising:
cutting off the one or more first corner cutting regions of the display substrate before bending the display substrate, and
cutting off the one or more second corner cutting regions of the structured back film at a substantially same time as the cutting off the one or more first corner cutting regions.

10. The manufacturing method according to claim 8, further comprising:
assembling additional functional modules of the flexible display panel after bending the display substrate.

11. The manufacturing method according to claim 10, wherein the assembling the additional functional modules of the flexible display panel comprises:
bonding a drive circuit module at a front surface of the first bonding region of the display substrate.

12. The manufacturing method according to claim 8, wherein providing the structured back film comprises at least one of the following operations:
removing only the back film bending region;
removing both the back film bending region and the one or more second corner cutting regions of the structured back film; or
removing the back film bending region, the one or more second corner cutting regions and the second bonding region of the structured back film.

13. The manufacturing method according to claim 12, wherein the providing the structured back film is performed by at least one of pattern etching, pattern printing, laser printing, or precision machining.

14. The manufacturing method according to claim 12, wherein each corner cutting region of the one or more second corner cutting regions of the structured back film comprises a first region corresponding to the back film bending region in a first direction of the structured back film and a second region corresponding to the second bonding region of the structured back film in the first direction, wherein removing both the back film bending region and the one or more second corner cutting regions of the structured back film comprises:
removing the back film bending region and the first region of each of the corner cutting regions of the structured back film while leaving the second region of each of the corner cutting regions; or
removing the back film bending region, the first region of the corner cutting region, and the second region of the corner cutting regions.

15. A flexible display panel manufactured by the manufacturing method according to claim 1,
wherein the flexible display panel comprises the display substrate and the back film positioned on the back surface of the display substrate,
wherein the display substrate comprises a first display region and a first non-display region,
wherein the first non-display region comprises a substrate bending region adjacent to the first display region, a first bonding region adjacent to the substrate bending region and away from the first display region, and one or more first corner cutting regions at one or both sides of the first non-display region and adjacent to the first display region,
wherein corresponding to respective functional regions of the display substrate, the back film comprises a second display region and a second non-display region,
wherein the second non-display region comprises a back film bending region adjacent to the second display region, a second bonding region adjacent to the back film bending region and away from the second display region, and one or more second corner cutting regions at one or both sides of the second non-display region and adjacent to the second display region, and
wherein the display substrate is bent toward a back surface of the display substrate along the substrate bending region.

16. The flexible display panel according to claim 15,
wherein the back film has a perforated region at least in the back film bending region, and
wherein a drive circuit module is bonded to a front surface of the display substrate.

17. The flexible display panel according to claim 15,
wherein the back film comprises a protective film and a pressure sensitive adhesive layer in a thickness direction of the back film,
wherein the protective film comprises a polyimide film or a polyethylene terephthalate film,
wherein a thickness of the pressure sensitive adhesive layer is within a range of [10 μm, 25 μm], and
wherein a thickness of the protective film is within a range of [50 μm, 150 μm].

18. A display device comprising the flexible display panel according to claim 15.

* * * * *